Jan. 18, 1966
J. F. SOLAREK
3,230,272
METHOD AND APPARATUS FOR CATALYTIC REACTIONS
Filed Jan. 8, 1963
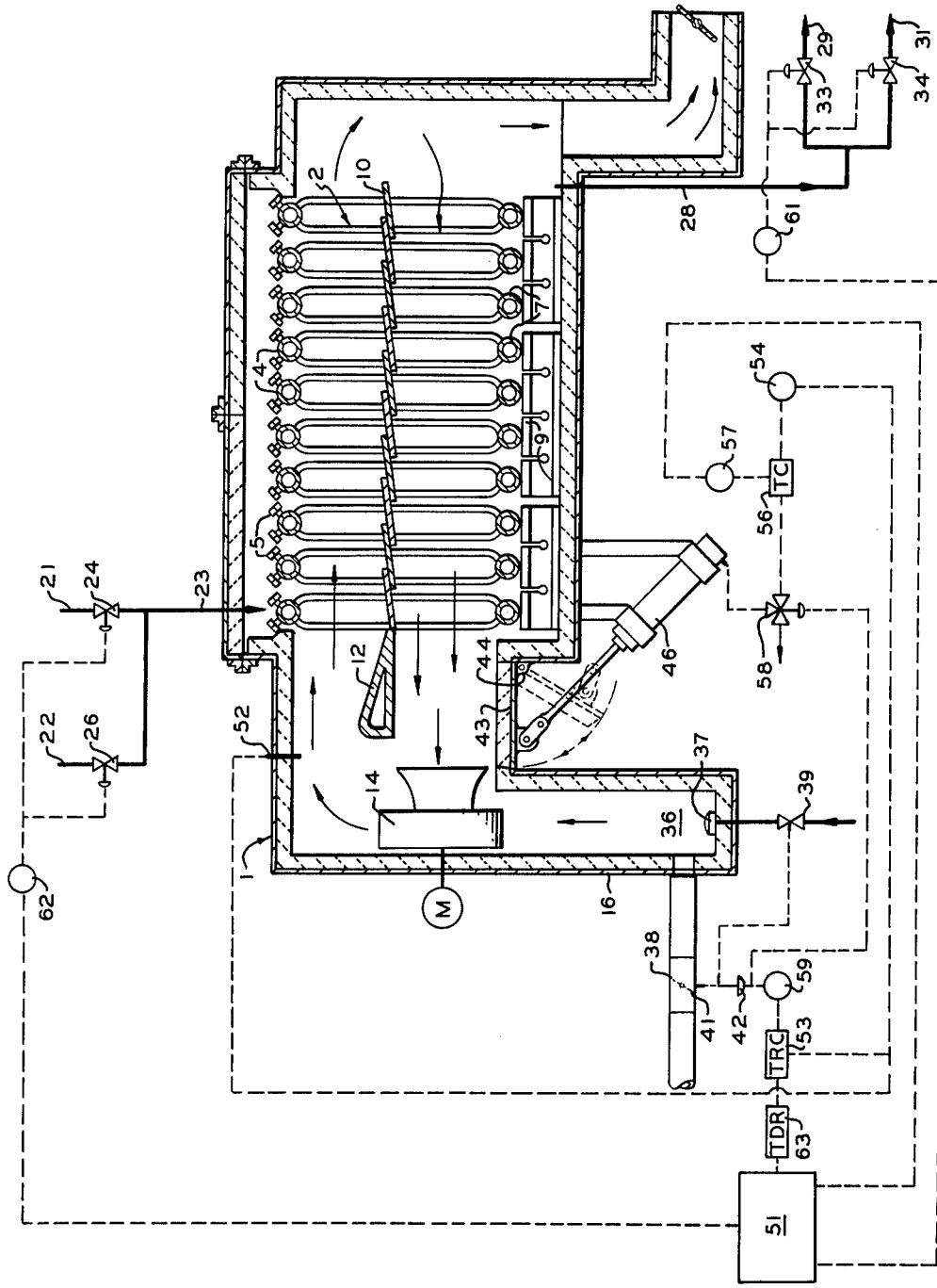
INVENTOR.
J.F. SOLAREK
BY *Young & Gregg*
ATTORNEYS United States Patent Office 3,230,272
Patented Jan. 18, 1966

3,230,272
METHOD AND APPARATUS FOR CATALYTIC REACTIONS
Joe F. Solarek, Borger, Tex., assignor to Phillips Petroleum Company, a corporation of Delaware
Filed Jan. 8, 1963, Ser. No. 250,144
3 Claims. (Cl. 260—683.3)

This invention relates to a method and apparatus for catalytic chemical reactions and control thereof.

In one respect, the invention relates to a method of controlling the temperature of a catalytic dehydrogenation zone during the regeneration cycle by controlling the flow of cooling gas according to the temperature of the zone. In another aspect, the invention relates to a method and apparatus for carrying out and controlling a catalytic dehydrogenation reaction.

In the dehydrogenation of butane to butene, the catalyst is arranged in banks or rows of catalyst-filled tubes called "harps." The material to be dehydrogenated is passed through the tubes in contact with the catalyst. Since the dehydrogenation reaction is endothermic, hot gases are generated in a combustion chamber, passed into a chamber surrounding the tubes and circulated around the tube to supply heat for the reaction. The circulated gas is passed to a stack from which the gas is discharged to the atmosphere. During the dehydrogenation, some of the materials are decomposed to coke which accumulates on the catalyst. This material is burned off to regenerate the catalyst. Since the catalyst regeneration is exothermic, it is necessary to supply cooling gases during the regeneration operation.

Thus, it is necessary to change the temperature of the gases to the temperature desired during the various parts of the cycle of dehydrogenation, cooling the catalyst for regeneration, controlling the temperature of regeneration, heating the catalyst to the desired temperature for dehydrogenation of hydrocarbons, and maintaining the proper dehydrogenation temperature.

An object of my invention is to provide close control of the temperature of a catalytic dehydrogenation operation and to control the temperature during regeneration by temperature control of a cooling gas inlet.

Another object of this invention is to provide method and apparatus for performing and controlling catalytic reactions.

According to my invention a feed to be converted is passed through a catalyst bed in a reaction zone during a conversion period, a deposit of carbonaceous material being deposited on the catalyst as a result of the conversion. Periodically the flow of the feed is discontinued and an oxygen-containing regeneration gas is passed through the bed to burn off the accumulated carbonaceous material and regenerate the catalyst. A heat transfer gas is supplied to a heat exchange zone in heat exchange relation with the reaction zone throughout the cycle of dehydrogenation and regeneration. The temperature in the heat exchange zone is measured continuously. During the conversion period heat is supplied to the exchange gas from the combustion zone and the fuel supplied to the combustion zone is controlled in response to the measured temperature. Cooling gas is not permitted to flow into the heat exchange gas during this period. During a regeneration period, the supply of fuel to the combustion zone is discontinued and the flow of cooling gas is permitted in response to the measured temperature to maintain the desired temperature for regeneration.

In the drawing, reference numeral 1 refers to a catalyst case containing a plurality of harps, one of which is indicated generally at 2, it being understood that each harp consists of a row of catalyst tubes lined up behind those shown in the figure. Each harp or tube is connected at the top to an inlet crossheader 4 and at the bottom to an outlet crossheader 7. Removable plugs 5 in crossheader 4 are inserted in a series of ports through which catalyst can be admitted into the several tubes. These crossheaders extend all the way across case 1. Outlet crossheads 7 rest on supporting rails 9 disposed in the bottom of case 1. A flexible baffle 10 extends across case 1 in a plane intersecting harps 2. A flow-directing member 12 is attached to the end of the baffle nearest fan 14.

One end of the inlet crossheaders 4 extends outside of case 1 and connects to a source of butane during the dehydrogenation stage and to a source of oxidizing gas during regeneration. In the drawing the butane inlet 21 is connected through conduit 23 and controlled by motor valve 24 while the regeneration gas inlet 22 is also connected with conduit 23 controlled by valve 26. One end of the outlet crossheader 7 also extends through the case 1 and connects with an exhaust stack during regeneration and to a means of butene storage during dehydrogenation. The butene storage is connected through conduit 29 controlled by valve 33 with conduit 28 from crossheader 7 while the exhaust stack is connected to conduit 31 controlled by valve 34.

Combustion chamber 36 is provided with a fuel inlet 37 controlled by valve 39 and with an air inlet 41 controlled by valve 38. Valves 38 and 39 are both actuated by pneumatic motor 42.

A cooling air inlet door 43 is hinged to catalyst case 1 by hinge 44, and is actuated by a pneumatic cylinder 46. The temperature-sensing element 52 is provided as shown and is connected with a temperature recorder-controller 53 and with an electric-to-pneumatic transducer 54. The outlet of transducer 54 is connected as the input to controller 56. The set point of controller 56 is adjusted by a controller 57 which provides for remote control of the set point of controller 56. The output of controller 56 is connected to a 3-way motor valve 58 which can be adjusted to close the output of controller 56 and to vent cylinder 46, or to close the vent and to connect the output of controller 56 with cylinder 46. The output of controller 53 is connected to an electric-to-pneumatic transducer 59, the output of which is connected with and actuates motor 42 to control valves 38 and 39. Transducers 61 and 62 are provided to convert an electrical signal from time control board 51 to a pneumatic signal for actuation of valves 24, 26, 33 and 34. A time delay relay 63 supplies an actuating signal to controller 53.

In normal operation during dehydrogenation, valves 24 and 33 are open, and valves 26 and 34 are closed. Door 43 is closed and valves 38 and 39 are under the control of pneumatic motor 42 from a signal from transducer 59 in proportion to the signal from controller 53. Controller 53 receives a signal from temperature-sensing element 52, and in this way the temperature within the catalyst case is controlled according to the set point of controller 53. For dehydrogenation of butane to butenes this temperature is about 1250° F. With the system in operation in this manner, signals are being transmitted from time control board 51 to transducers 61 and 62, and controller 53. During the time that controller 53 is in operation, transducer 59 sends a signal to valve 58 which vents cylinder 46 and shuts off the connection to controller 56, thus disabling this portion of the control system, allowing door 43 to remain tightly closed.

When it is time for regeneration of the catalyst, the signals to controller 53 and to transducers 61 and 62 are discontinued, thus disabling them, and a signal is transmitted to actuate controller 57. With controller 53 disabled, valves 39 and 38 are closed and valve 58 turns to close the vent and to connect controller 56 with cylinder 46. Valves 24 and 33 are closed and valves 26 and 34 are opened. This permits regeneration gas to flow through the catalyst in the tubes. Temperature control is maintained by the position of the door 43 which is controlled according to the temperature measured by element 52 and transmitted through transducer 54 to controller 56. This results in very accurate control of the regeneration cycle. Regeneration, in the case of the conversion of butane to butenes, is at a temperature of about 850° F.

The system illustrated is, of course, very greatly simplified. In a commercial plant, usually there are provided a plurality of catalyst cases, some being on regeneration while others are on production. Separate signals can be provided for each of the control valves for suitable time delay if desired to permit cooling of the catalyst, for example, prior to inlet of a regeneration gas, etc. It often is desirable to provide for flow of a purge gas between regeneration and dehydrogenation portions of the cycle, in which instance suitable time delay is provided for the actuation of the controls and valves and an additional inlet is provided into conduit 23 for the purge gas. The control system can be pneumatic, electric, or a combination of the two as described. The combination of electric and pneumatic operation has been found to be particularly advantageous since it is relatively simple to transmit the electrical actuation signals over long distances, but it is desirable to have pneumatic operation of the various valves and controls. This can be accomplished in the system illustrated by utilizing a number of electric-to-pneumatic transducers. A suitable instrument for controller 53 is Teloset Recorder type 7T3X as illustrated in the Catalog G-1 of Minneapolis-Honeywell Regulator Company. The selection of valves and control instruments for the other elements of the combination can be made by one skilled in the art.

Reasonable variation and modification are possible within the scope of my invention which sets forth method and apparatus for providing close temperature control by dehydrogenating and regenerating the dehydrogenation catalyst.

I claim:

1. In a method of catalytic conversion, comprising, passing a feed to be converted to a catalyst bed in a reaction zone during a conversion period, a deposit of carbonaceous material being deposited on said catalyst as a result of the conversion,
periodically discontinuing the flow of said feed and passing an oxygen-containing regeneration gas through said bed during the regeneration period, and
supplying a heat transfer gas to a heat exchange zone in heat exchange relation with said reaction zone, the combination therewith of the steps of
continuously measuring a temperature of said heat exchange zone,
during said conversion period supplying heat to said heat transfer gas from a combustion zone,
supplying fuel and combustion air to said combustion zone, controlling said fuel supply in response to said temperature and stopping flow of a cooling gas into said heat exchange zone during said conversion period, thereby maintaining said temperature, and
during said regeneration period permitting flow of said cooling gas in response to said temperature to maintain said temperature.

2. In apparatus for catalytic conversion, comprising,
a reactor having a bed of solid catalyst,
first feed means to pass a feed to be converted through said reactor in contact with said bed,
first valve means to stop flow through said feed means during a regeneration period,
second feed means to pass an oxygen-containing regeneration gas through said reactor in contact with said bed,
second valve means to stop flow of said oxygen-containing regeneration gas during a conversion period,
heat exchange means to supply a heat transfer gas in heat exchange relation with said reactor, and
means to supply heat to said heat exchange gas, comprising a combustion chamber, the combination therewith of
a cooling gas inlet to supply a cooling gas to cool said heat exchange gas,
a fuel burner in said combustion chamber,
fuel supply means for said burner including a fuel control valve,
air supply means for said combustion chamber, including an air control valve,
adjustable closure means to regulate the flow of said cooling gas through said cooling gas inlet,
first control means having first control signal output means,
second control means having second control signal output means,
means to measure the temperature in said heat exchange means and produce a first signal representative of said temperature,
means to apply said first signal to said first and second control means as an input signal,
a first actuator for said adjustable closure means,
a second actuator for said fuel control valve and said air control valve,
first control signal transmission means to connect said first control signal output means with said first actuator,
disconnect means for said first control signal transmission means,
a third actuator for said disconnect means,
second control signal transmission means to connect said second control signal output means with said second and third actuators to control said fuel and air control valves and to disconnect said first control signal transmission means, and
means to supply actuation signals to actuate said second control means, open said first valve means and close said second valve means.

3. In apparatus for catalytic conversion, comprising,
a reactor having a bed of solid catalyst,
a first feed conduit to pass a feed to be converted through said reactor in contact with said bed,
a first valve in said first feed conduit,
a second feed conduit to pass an oxygen-containing regeneration gas through said reactor in contact with said bed,
a second valve in said second feed conduit,
heat exchange means to supply a heat transfer gas in heat exchange relation with said reactor, and
means to supply heat to said heat transfer gas, comprising a combustion chamber, the combination therewith of
a cooling gas inlet to supply a cooling gas to cool said heat exchange gas,
a fuel burner in said combustion chamber,
fuel supply means for said burner, including a fuel control valve,
air supply means for said combustion chamber, including an air control valve,
adjustable closure means to regulate the flow of said cooling gas through said cooling gas inlet,
a pneumatic controller having a first pneumatic signal output passageway,
an electric controller having first means to transmit an electrical output signal,
a first pneumatic actuator for said first valve,
a second pneumatic actuator for said second valve,
a third pneumatic actuator for said adjustable closure means,
a fourth pneumatic actuator for said fuel control valve and said air control valve, first fluid conduit means to connect said first pneumatic output passageway with said third pneumatic actuator, a three-way valve in said first fluid conduit, said valve in a first position completing a fluid passage from said first pneumatic output passageway to said third pneumatic actuator and in a second position closing said first pneumatic output passageway and venting said third pneumatic actuator, a fifth pneumatic actuator for said three-way valve, a first electric to pneumatic transducer to convert an electrical signal from said electric controller to a pneumatic signal, second fluid conduit means to connect the output of said first transducer with said fourth and fifth pneumatic actuators, a second electric to pneumatic transducer, means to measure the temperature in said heat exchange means and produce an electrical signal representative of said temperature and to apply said electrical signal to said electrical controller and said second transducer as an input signal, third fluid conduit means to connect the output of said second transducer with said pneumatic controller as an input signal, a third electric pneumatic transducer, means to apply a first electrical actuation signal to said electric controller, means to supply a second electrical actuation signal to said third transducer, and fourth fluid conduit means to connect the output of said third transducer with said first and second pneumatic actuators.

References Cited by the Examiner
UNITED STATES PATENTS 2,918,506  12/1959  Mathis et al. _____ 260—683.3
2,945,077  7/1960  Polk _____ 260—683.3

DELBERT E. GANTZ, *Primary Examiner.*

ALPHONSO D. SULLIVAN, *Examiner.*